(12) United States Patent
Robinson et al.

(10) Patent No.: US 7,859,146 B2
(45) Date of Patent: Dec. 28, 2010

(54) END WINDING COOLING

(75) Inventors: Fronz Robinson, Littleton, CO (US); Juha Saari, Etela-Suomen Laani (FI)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/234,767

(22) Filed: Sep. 22, 2008

(65) Prior Publication Data

US 2010/0072863 A1 Mar. 25, 2010

(51) Int. Cl.
*H02K 3/24* (2006.01)
*H02K 9/00* (2006.01)
*H02K 3/00* (2006.01)

(52) U.S. Cl. .............................. 310/65; 310/58; 310/59; 310/64; 310/184

(58) Field of Classification Search .................... 310/64, 310/54–59, 184
See application file for complete search history.

(56) References Cited

U.S. PATENT DOCUMENTS

| | | | |
|---|---|---|---|
| 2,727,161 A * | 12/1955 | Kilner et al. ................... | 310/64 |
| 4,217,511 A | 8/1980 | King | |
| 4,600,848 A | 7/1986 | Sutrina | |
| 4,797,588 A | 1/1989 | Capion | |
| 4,862,024 A | 8/1989 | Stingle | |
| 5,363,002 A | 11/1994 | Hernden | |
| 6,787,948 B2 * | 9/2004 | Peterson et al. ............... | 310/58 |
| 6,809,441 B2 | 10/2004 | Randall | |
| 6,838,799 B1 | 1/2005 | Caiozza | |
| 7,242,119 B2 | 7/2007 | Gomes de Lima | |
| 7,365,462 B2 | 4/2008 | Sakakibara | |
| 2007/0228846 A1 | 10/2007 | Rao | |

FOREIGN PATENT DOCUMENTS

| | | | |
|---|---|---|---|
| JP | 55056446 A | * | 4/1980 |
| JP | 59159638 A | * | 9/1984 |
| JP | 59208182 A | * | 11/1984 |
| JP | 02297904 A | * | 12/1990 |

OTHER PUBLICATIONS

Translation JP59208182A and JP02297904A.*
Derwent Translation Abstact and Constitution JP59159638 (1984) and JP55056446(1980).*
Wikipidea Web Site.*

* cited by examiner

*Primary Examiner*—Quyen Leung
*Assistant Examiner*—Jose A Gonzalez Quinones
(74) *Attorney, Agent, or Firm*—Carlson, Gaskey & Olds PC

(57) ABSTRACT

A rotary cooling system is provided that includes a stator having at least one tooth and a plurality of wires coiled around the tooth and a passage extending between the plurality of wires.

25 Claims, 4 Drawing Sheets

END WINDING COOLING

BACKGROUND OF THE INVENTION

This disclosure generally relates to cooling systems, and more particularly to cooling systems for electromechanical rotary machines.

Electromechanical rotary machines, such as electric motors or generators, generate a significant amount of heat during operation. Electric motor coils conduct electrical current to cause rotation of a rotor relative to a housing. The coils have resistive losses which generate heat within the coils and particularly within end winding coils. When operating an electric motor under heavy loads in high ambient temperatures, an inner portion of the end winding coils can reach or exceed an acceptable operating temperature, causing failure or decreasing the operating life of the electric motor.

A variety of techniques have been applied to cooling an electric motor and in particular stator end winding coils. Typical cooling designs direct cooling fluid at the circumference of the end winding coils or through a rotor gap. However, neither of these approaches addresses cooling the inner portion of the end winding coils.

SUMMARY OF THE INVENTION

An exemplary rotary cooling system includes a plurality of wires coiled around a stator tooth and a passage extending between the plurality of wires.

An example rotary machine assembly includes a housing, a stator and a rotor for rotation about an axis. The stator is located radially inside the housing and the rotor is located radially inside the stator. A plurality of wires is coiled around at least one stator tooth. A passage extends between said plurality of wires for a pumping device to pump a cooling fluid.

An example method of assembling a rotary machine includes forming a passage extending between a plurality of wires coiled around a stator tooth.

BRIEF DESCRIPTION OF THE DRAWINGS

The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
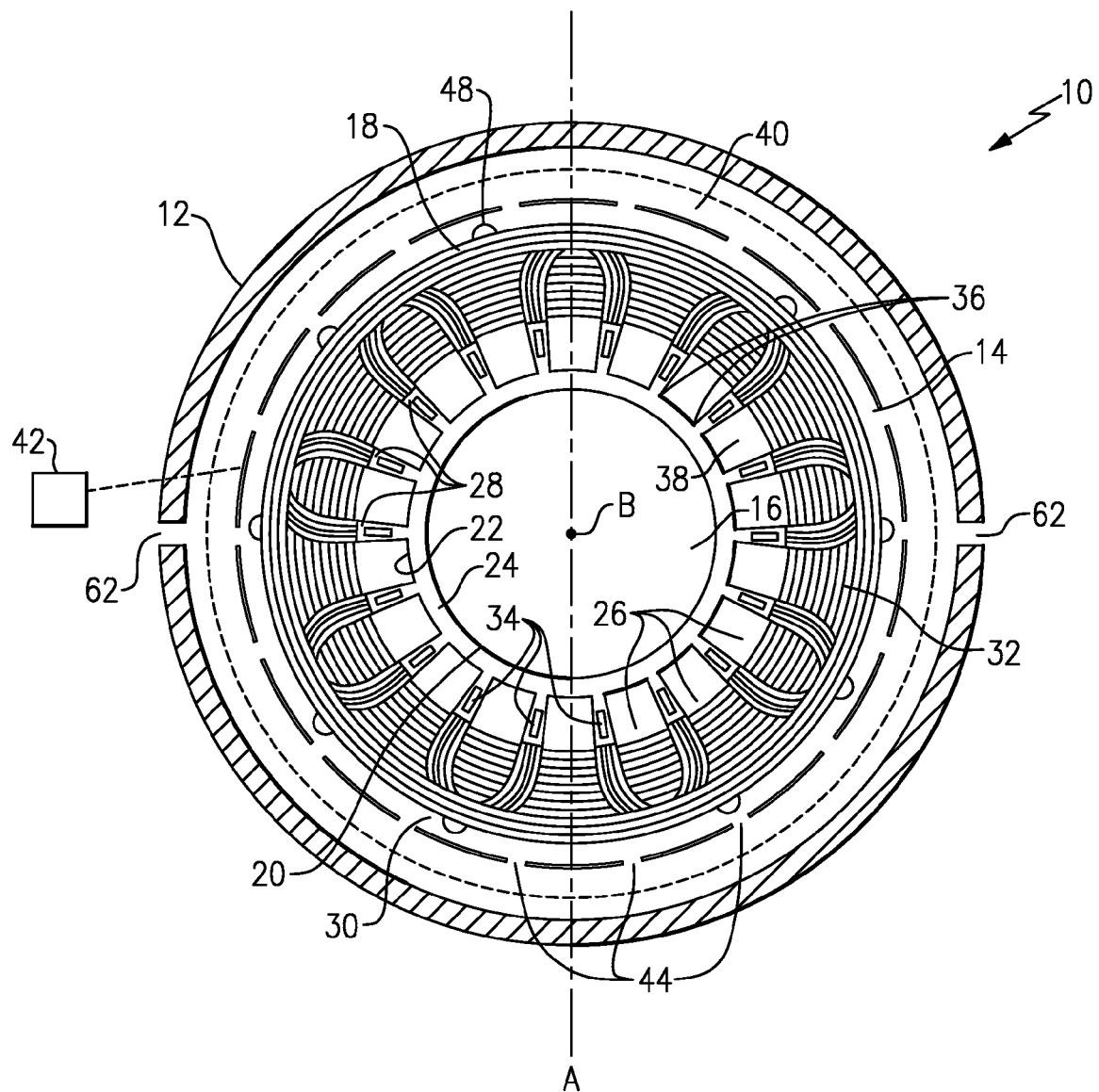
FIG. 1 is a cross-sectional end view of an example cooling system for an electromechanical rotary machine.

FIG. 1 illustrates a cross-sectional end view of an electromechanical rotary machine 10. The rotary machine 10 includes a housing 12 having a stator 14 and a rotor 16. The rotor 16 is located inside the stator 14 and the stator 14 is located inside the housing 12. The rotary machine 10 may be a generator or a motor. For a generator, the rotor 16 would be driven about axis B to generate an electrical current in a plurality of wires 18 located on the stator 14. For a motor, current would flow through the plurality of wires 18 generating a magnetic field in the rotor 16 to cause rotation of the rotor 16.

The rotor 16 includes an outer surface 20 and the stator 14 includes an inner surface 22 proximate to the outer surface 20 of the rotor 16. A rotor gap 24 is formed between the outer surface 20 of the rotor 16 and the inner surface 22 of the stator 14. The rotor gap 24 facilitates reducing frictional losses during operation of the rotary machine 10 while permitting air to flow through the rotor gap 24 to cool the outer surface 20 and the inner surface 22.

The stator 14 includes at least one tooth 26 extending axially along axis B. Teeth 26 are spaced apart to form a plurality of channels 28 along the inner surface 22. Wires 18 extend through the plurality of channels 28 and wrap around an end portion 30 of the stator 14. The wires 18 located axially outward from the stator 14 may be referred to as end windings 32. Fillers 34 may be located within the channels 28 radially inward from the wires 18. The fillers 34 engage projections 36 located on an end 38 of each tooth 26 to secure the wires 18 within the channels 28 and prevent the wires 18 from entering the rotor gap 24.

The housing 12 may include a ducts 40 connected to a fluid pumping device 42, such as an air blower. The ducts 40 include impingement holes 44 axially aligned with the end windings 32. The impingement holes 44 direct a cooling fluid toward the end windings 32. Although the ducts 40 are shown adjacent the housing 12, it is understood that other cooling arrangements could be used, such as alternate duct paths or a fan attached to a rotor shaft.

Figure 2:
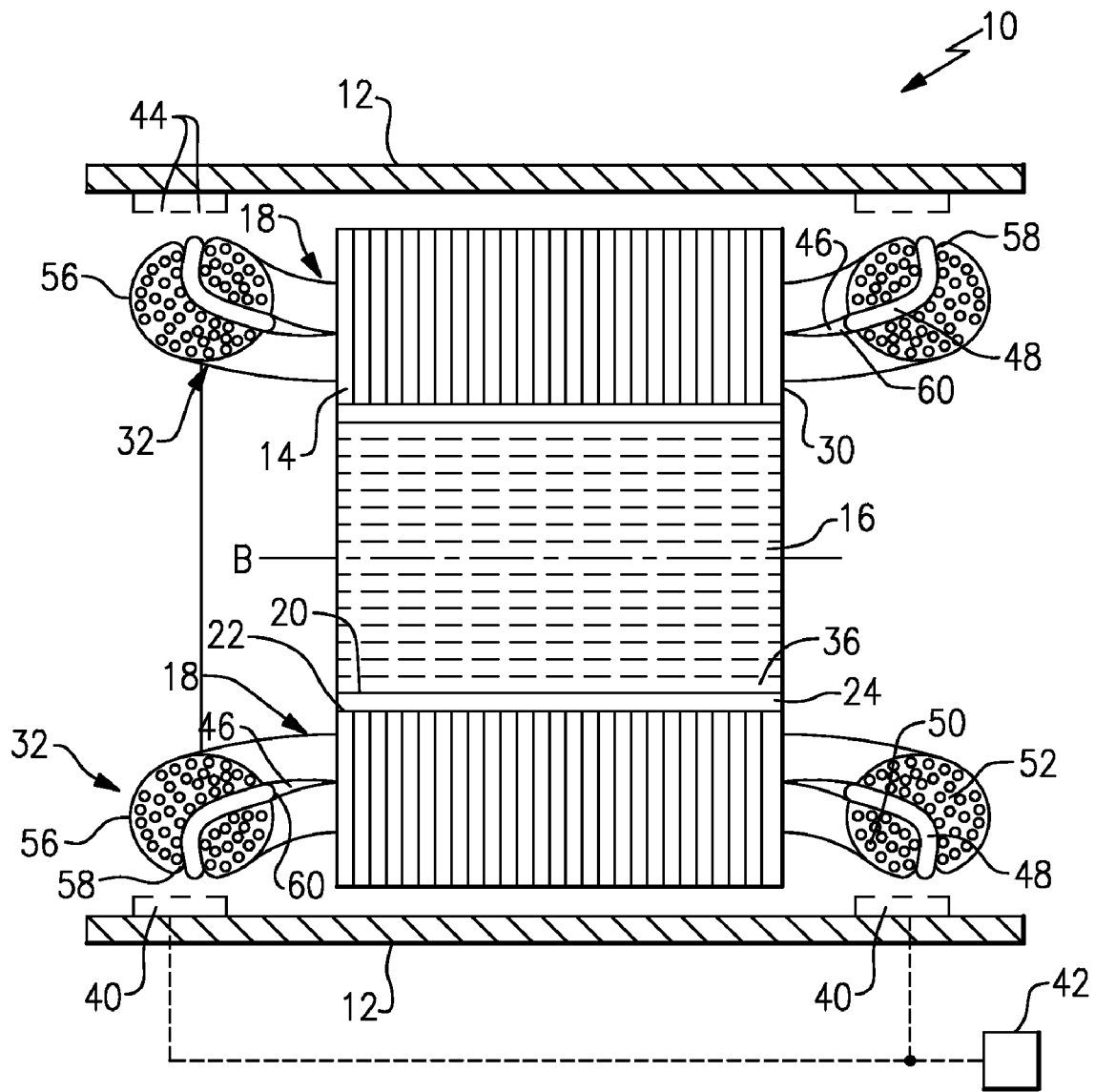
FIG. 2 is a cross-sectional view of the electromechanical rotary machine of FIG. 1 taken along line A.
Figure 3:
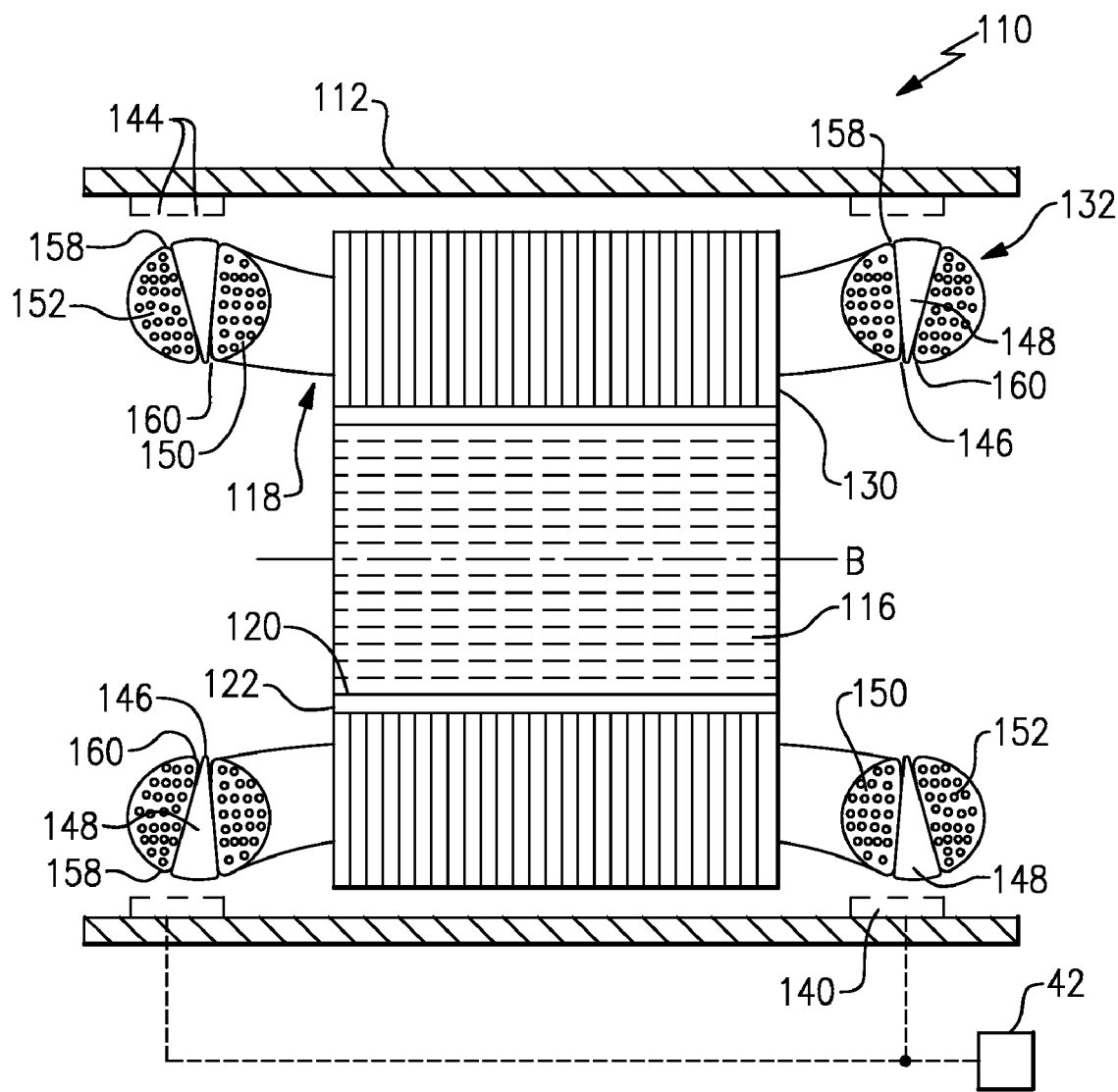
FIG. 3 is a cross-sectional view of another example electromechanical rotary machine.

FIG. 2 illustrates a cross-sectional view of the rotary machine 10 taken along line A. The rotary machine 10 includes a passage 46 extending between wires 18 and having an inlet 58 and an outlet 60. In one example, spacers 48 are located between the end windings 32 to create the passage 46. The spacers 48 may extend through an inner portion of the end windings 32. The shape of the spacers 48 and the length of the passage 46 may vary depending on the desired level of cooling and the specific wires to be cooled as shown in FIG. 2 and FIG. 3. The spacers 48 may be made from an electrically nonconductive material capable of maintaining strength and stiffness during operation in high temperatures, such as a polymeric material. In one example, the spacers 48 are phenolic polymer.

Figure 4:
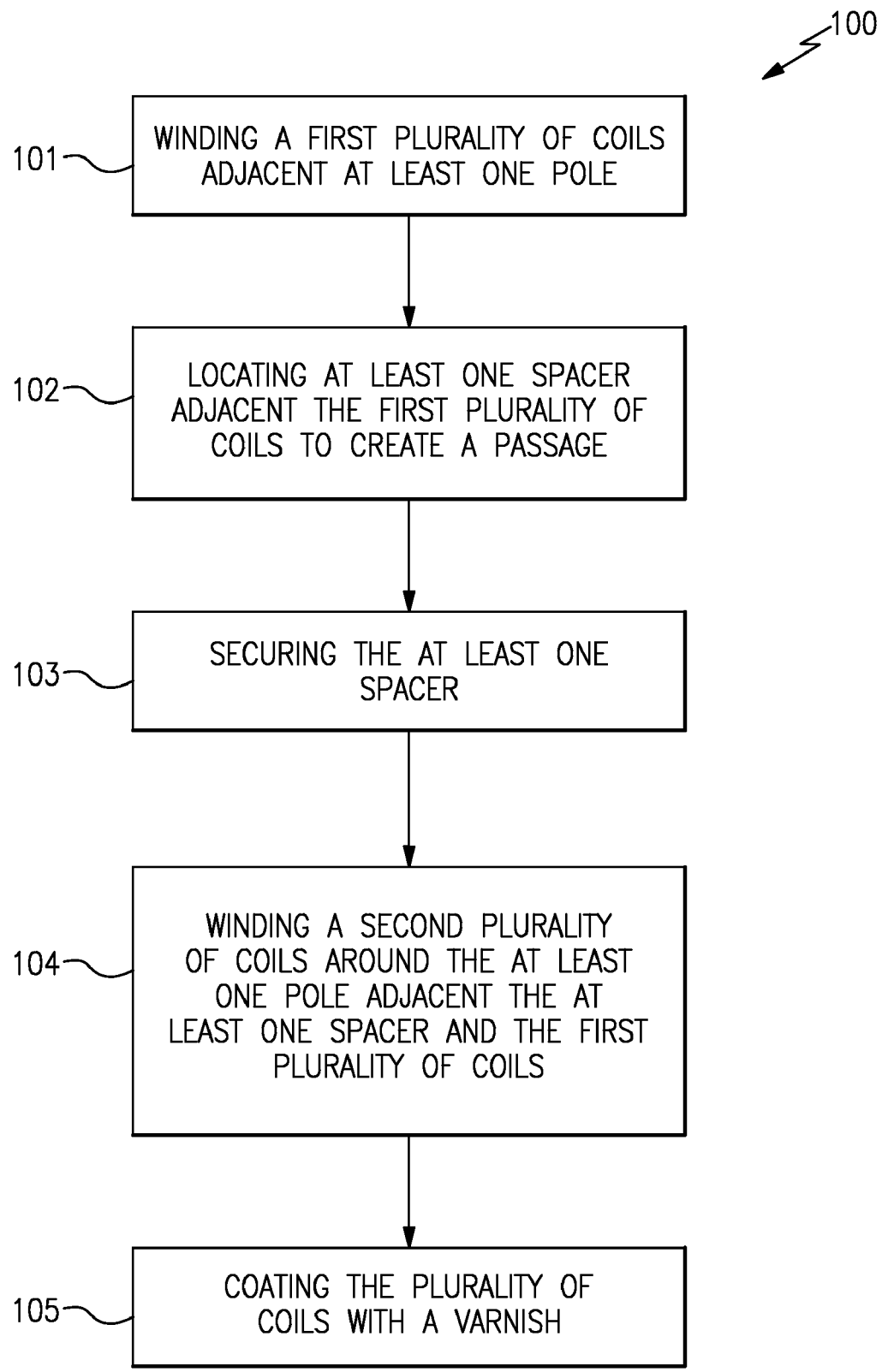
FIG. 4 is a flow chart illustrating an example assembly method.

The rotary machine 10 is assembled by forming the passage 46 extending between the wires 18 coiled around the stator 14. For instance, the passage 46 may be formed using any suitable technique for creating a space between the wires 18. In one example, FIG. 4 illustrates a flow chart of an example method 100 for assembling the rotary machine 10 using the spacers 48. In step 101, a first set of wires 50 is wound adjacent each tooth 26. In step 102, at least one spacer 48 is located adjacent the first set of wires 50. In step 103, a retention device 54, such as an adhesive, a piece of insulation or a frictional force may be used to secure the spacer 48 within the plurality of wires 18. In step 104, a second set of wires 52 is then wound adjacent the first set of wires 50 and at least one of the spacers 48. In step 105, the wires 18 and the spacers 48 are coated with a varnish 56 for protection from the surrounding environment. The varnish 56 may also coat the passages 46 between the wires 18.

The rotary machine 10 functions by having the pumping device 42 fluidly connected to the ducts 40. The impingement holes 44 direct the cooling fluid towards the end windings 32. The cooling fluid may enter the inlet 58 of the passage 46 and cool the end windings 32. As the cooling fluid exits the outlet 60 of the passage 46, a portion of the cooling fluid may then enter the rotor gap 24 to cool the stator 14 and the rotor 16 or be exhausted through vents 62 extending through the housing 12.

In one example the rotary machine 10 is operated at a range of 20,000-100,000 rpm, 100-600 kW, and 400-690V. Of course these values are only example, and other values could be used.

While a preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A rotary machine cooling system comprising:
   a plurality of wires coiled around at least one stator tooth and formed into a first set and a second set; and
   a passage extending between said first set and said second set and including a passage inlet and a passage outlet relative to flow therethrough, and said passage inlet and said passage outlet are located in a first end portion of said plurality of wires axially outward from said at least one stator tooth, wherein at least one spacer extends between said first set and said second set and said passage extends adjacent said at least one spacer and said first and said second set.

2. The rotary machine cooling system of claim 1, wherein said at least one spacer is comprised of a polymeric material.

3. The rotary machine cooling system of claim 1, wherein said passage and said at least one spacer includes a varnish.

4. The rotary machine cooling system of claim 1, wherein said passage inlet is located radially outward from said passage outlet.

5. The rotary machine cooling system of claim 4, further comprising a rotor gap located between an inner surface of said stator and an outer surface of a rotor at least partially fluidly connected to said passage outlet.

6. The rotary machine cooling system of claim 1, further comprising a pump for pumping a cooling fluid through said passage.

7. The rotary machine cooling system of claim 1, wherein said passage terminates prior to entering a stator that includes said at least one stator tooth.

8. A rotary machine assembly comprising:
   a rotor for rotation about an axis;
   a stator located radially outward from said rotor;
   a housing located radially outward from said stator;
   a plurality of wires coiled around at least one tooth located on said stator;
   a passage extending between said plurality of wires separating a first set of wires and a second set of wires and including a passage inlet and a passage outlet, and said passage inlet and said passage outlet are located in a first end portion of said plurality of wires axially outward from said stator and said passage inlet is located radially outward from said passage outlet; and
   a pump for pumping a fluid through said passage.

9. The rotary machine assembly of claim 8, wherein said housing includes a plurality of ducts fluidly connected with said pump and said passage.

10. The rotary machine assembly of claim 9, wherein said housing includes a plurality of impingement holes located in said plurality of ducts axially outward from an end portion of said stator.

11. The rotary machine assembly of claim 8, wherein said plurality of wires forms two groups of wires and further comprising at least one spacer extending between said groups of wires, said passage extending adjacent said at least one spacer and said plurality of wires.

12. The rotary machine assembly of claim 11, wherein said at least one spacer is located axially outward from said stator.

13. A method of assembling a rotary machine comprising:
   forming a passage extending between a plurality of wires coiled around a stator tooth by attaching a spacer to said plurality of wires, wherein said passage includes a passage inlet and a passage outlet located in a first end portion of said plurality of wires axially outward from said stator tooth.

14. The method as recited in claim 13, further comprising coiling a first plurality of wires around said stator tooth and attaching said spacer to said first plurality of wires.

15. The method as recited in claim 14, further comprising coiling a second plurality of wires adjacent said first plurality of wires, said spacer, and said stator tooth.

16. The method as recited in claim 13, further comprising locating a spacer axially outward from said stator tooth.

17. The rotary machine cooling system of claim 1, wherein said at least one spacer is located in an end portion of said plurality of wires axially outward from an end portion of said stator.

18. The rotary machine of claim 8, wherein the plurality of wires form at least one wall of the passage.

19. The rotary machine cooling system of claim 1, wherein at least one wire of said plurality of wires continuously surrounds said at least one stator tooth.

20. The rotary machine cooling system of claim 1, wherein said passage extends adjacent a perimeter of said first and second sets of wires.

21. The rotary machine cooling system of claim 1, wherein said passage extends exclusively adjacent said first and second sets.

22. The rotary machine cooling system of claim 1, wherein said passage includes a single input and a single outlet.

23. The rotary machine cooling system of claim 8, wherein said passage terminates prior to entering said stator and extends exclusively adjacent said first and second sets.

24. The rotary machine cooling system of claim 1, wherein a first portion of said passage extends radially and a second portion of said passage extends axially.

25. The rotary machine cooling system of claim 10, wherein said impingement holes are located radially outward from said plurality of wires.

* * * * *